(12) United States Patent
Yoon et al.

(10) Patent No.: US 11,888,157 B2
(45) Date of Patent: Jan. 30, 2024

(54) CATHODE ACTIVE MATERIAL, CATHODE COMPRISING SAME, AND SECONDARY BATTERY

(71) Applicants: KOREA UNIVERSITY RESEARCH AND BUSINESS FOUNDATION, Seoul (KR); RESEARCH & BUSINESS FOUNDATION SUNGKYUNKWAN UNIVERSITY, Suwon-si (KR)

(72) Inventors: Won Sub Yoon, Seoul (KR); Yong Mook Kang, Seoul (KR); Mi Ru Jo, Seoul (KR); Junghoon Yang, Seoul (KR); Yunok Kim, Suwon-si (KR)

(73) Assignees: Korea University Research and Business Foundation, Seoul (KR); Research & Business Foundation Sungkyunkwan University, Suwon-si (KR)

( * ) Notice: Subject to any disclaimer, the term of this patent is extended or adjusted under 35 U.S.C. 154(b) by 533 days.

(21) Appl. No.: 17/263,284

(22) PCT Filed: Jul. 26, 2019

(86) PCT No.: PCT/KR2019/009325
§ 371 (c)(1),
(2) Date: Jan. 26, 2021

(87) PCT Pub. No.: WO2020/022831
PCT Pub. Date: Jan. 30, 2020

(65) Prior Publication Data
US 2021/0143420 A1    May 13, 2021

(30) Foreign Application Priority Data
Jul. 27, 2018   (KR) ......................... 10-2018-0088042

(51) Int. Cl.
*H01M 4/505*    (2010.01)
*H01M 10/0525*    (2010.01)
(Continued)

(52) U.S. Cl.
CPC ....... *H01M 4/505* (2013.01); *H01M 10/0525* (2013.01); *H01M 10/0568* (2013.01); *H01M 10/0569* (2013.01); *H01M 2300/0017* (2013.01)

(58) Field of Classification Search
None
See application file for complete search history.

(56) References Cited

U.S. PATENT DOCUMENTS 9,502,714 B2    11/2016    Kuze et al.
2017/0062819 A1*    3/2017    Ikenuma ............... H01M 4/366

FOREIGN PATENT DOCUMENTS

JP    2001-332258 A    11/2001
KR    10-2016-0022103 A    2/2016
(Continued)

OTHER PUBLICATIONS

Chitrakar, Ramesh, et al. "Synthesis of Layered-Type Hydrous Manganese Oxides from Monoclinic-Type LiMnO2," *Journal of Solid State Chemistry*, 160, 1, 2001 (pp. 69-76).
(Continued)

*Primary Examiner* — Wyatt P McConnell
(74) *Attorney, Agent, or Firm* — NSIP Law

(57) ABSTRACT

Provided are a cathode active material, a cathode comprising same, and a secondary battery. The cathode active material contains crystal water and a manganese-based metal oxide and has a first crystal phase having a two-dimensional crystal structure and a second crystal phase having a three-dimensional crystal structure, wherein the three-dimensional crystal structure is formed by the combination of manganese
(Continued)

in the manganese-based metal oxide and oxygen in the crystal water.

17 Claims, 11 Drawing Sheets

(51) Int. Cl.
*H01M 10/0568* (2010.01)
*H01M 10/0569* (2010.01)

(56) References Cited

FOREIGN PATENT DOCUMENTS

KR  10-2016-0066638 A  6/2016
KR  10-2016-0125050 A  10/2016

OTHER PUBLICATIONS

Nakano, Hideyuki et al., "Cathodic Behavior of Layered Manganese Oxides from Potassium Permanganate for Rechargeable Lithium Cells," *Key Engineering Materials.*, vol. 248. Trans Tech Publications Ltd, 2003 (pp. 1-5).

Shao, Jie, et al., "Study on different power and cycling performance of crystalline KxMnO2-nH2O as cathode material for supercapacitors in Li2SO4, Na2SO4, and K2SO4 aqueous electrolytes," *Journal of power sources*, 223, 2013 (pp. 56-61).

Nam, Kwan Woo, et al., "The High Performance of Crystal Water Containing Manganese Birnessite Cathodes for Magnesium Batteries," *Nano letters*, 15, 6, 2015 (pp. 4071-4079).

Li, Yanyang, et al., "From α-NaMnO 2 to Crystal Water Containing Na-birnessite: Enhanced Cycling Stability for Sodium-ion Batteries," *CrystEngComm*, 18, 17, 2016 (pp. 3136-3141).

Wu, Zhen-Guo, et al., "Mn-based cathode with synergetic layered-tunnel hybrid structures and their enhanced electrochemical performance in sodium ion batteries," *ACS applied materials & interfaces*, 9, 25, 2017 (pp. 21267-21275).

Jiang, Yalong, et al., "Pseudocapacitive layered birnessite sodium manganese dioxide for high-rate non-aqueous sodium ion capacitors," *Journal of Materials Chemistry A*, 6, 26, 2018 (pp. 12259-12266).

Yang, Eunjeong, et al., "Origin of unusual spinel-to-layered phase transformation by crystal water," *Chemical science*, 9, 2, 2018 (pp. 433-438).

International Search Report dated Oct. 25, 2019 in counterpart International Patent Application No. PCT/KR2019/009325 (3 pages in English and 3 pages in Korean).

* cited by examiner

CATHODE ACTIVE MATERIAL, CATHODE COMPRISING SAME, AND SECONDARY BATTERY

CROSS REFERENCE TO RELATED APPLICATION(S)

This application is a U.S. National Stage Application of International Application No. PCT/KR2019/009325, filed on Jul. 26, 2019, which claims the benefit under 35 USC 119(a) and 365(b) of Korean Patent Application No. 10-2018-0088042, filed on Jul. 27, 2018, in the Korean Intellectual Property Office, the entire disclosure of which is incorporated herein by reference for all purposes.

TECHNICAL FIELD

The present disclosure relates to a cathode active material, a cathode including the same and a secondary battery

BACKGROUND ART

Batteries are media that store electrical energy in a form of chemical energy and are energy storage media widely used in various electronic devices. Among them, a secondary battery has characteristics capable of reversible charging/discharging, and includes an electrode, an electrolyte, and a separator.

Among them, it is the electrode that mainly contributes to the electrochemical properties of the secondary battery, and the electrode includes a cathode and an anode, and each electrode contains an active material for electrochemical activity.

Among various types of secondary batteries, a lithium secondary battery including a lithium-based material as a cathode active material is widely used. $LiCoO_2$ is mainly used as a cathode active material of the lithium secondary battery, and graphite, a carbon-based material, is mainly used as an anode active material.

These lithium secondary batteries are widely used as energy storage media for portable electronic devices because of their high energy density, no memory effect, and low self-discharge.

Meanwhile, as devices, such as electric vehicles, that require better electrochemical properties than existing energy storage media emerge, research on secondary batteries capable of satisfying various electrochemical properties required by various devices is in progress.

DETAILED DESCRIPTION OF THE INVENTION

Technical Problem

It is to provide a cathode active material capable of exhibiting excellent capacity characteristics and life characteristics, a cathode including the same, and a secondary battery.

Technical Solution

According to an embodiment, cathode active material includes crystal water, and a manganese-based metal oxide, wherein the cathode active material includes a first crystal phase having a two-dimensional crystal structure and a second crystal phase having a three-dimensional crystal structure, and the three-dimensional crystal structure is formed by a combination of manganese in the manganese-based metal oxide and oxygen in the crystal water.

In a unit lattice of the three-dimensional crystal structure, the manganese may fill an octahedral site and a tetrahedral site of the unit lattice.

In a unit lattice of the two-dimensional crystal structure, the manganese may fill an octahedral site of the unit lattice.

The second crystal phase may be contained in an amount of more than 0 to 10 parts by weight based on 100 parts by weight of the cathode active material.

The crystal water may be contained 0.01 mol to 0.5 mol for 1 mol of the manganese-based metal oxide.

The two-dimensional crystal structure may include two or more unit layers including manganese oxide, and at least one metal element which is disposed between two or more unit layers and is selected from the group of metals other than the manganese.

A gap between the unit layers may be 3 Å to 6 Å.

At least some of the crystal water may be disposed between the two or more unit layers.

The first crystal phase may be a stable phase, the second crystal phase may be a metastable phase, and the first crystal phase and the second crystal phase may have a reversible phase transition relationship.

The cathode active material may be represented by Formula 1 below.

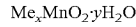    [Formula 1]

In Formula 1, (Me) is at least one metal element selected from the group consisting of an alkali metal element and an alkaline earth metal element, $0.23 \leq x \leq 1$, and $0.01 \leq y \leq 0.5$.

The Me may be at least one element selected from Li, Na, K, Ca, and Mg.

Meanwhile, according to another embodiment, a cathode including the above-described cathode active material is provided.

Meanwhile, according to still another embodiment, a secondary battery including the cathode, an anode, and an electrolyte interposed between the cathode and the anode is provided.

The electrolyte may be a non-aqueous electrolyte.

In the cathode, a reversible phase transition between the first crystal phase and the second crystal phase may occur depending on oxidation or reduction of manganese in the manganese-based metal oxide.

In a charged state of the secondary battery, at least a part of the first crystal phase may be phase-transferred to the second crystal phase.

In a discharged state of the secondary battery, at least a part of the second crystal phase may be phase-transferred to the first crystal phase.

Advantageous Effects of the Invention

It is possible to provide a cathode active material capable of exhibiting excellent capacity characteristics and life characteristics.

Meanwhile, a cathode and a secondary battery including the cathode active material include the cathode active material, thereby satisfying various electrochemical characteristics required by various devices.

BEST MODE

Figure 1:
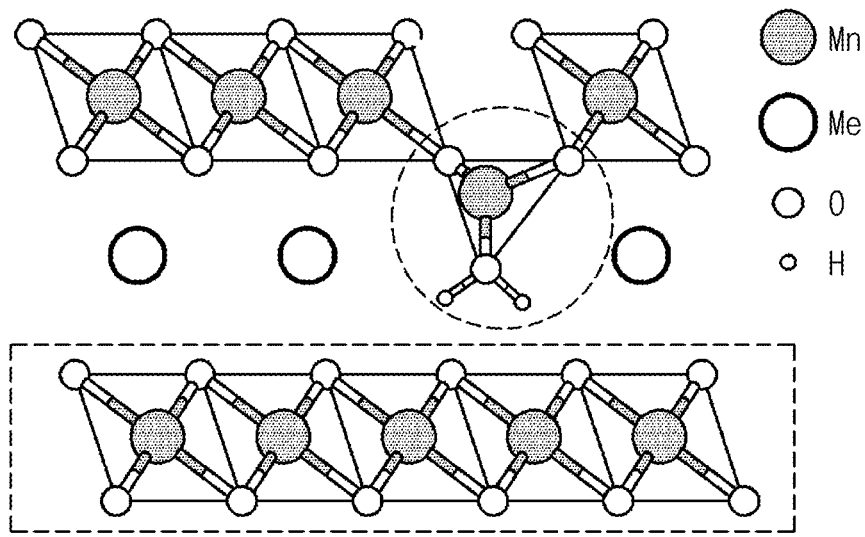
FIG. 1 is a view illustrating two different crystal structures in a cathode active material according to an embodiment.

Hereinafter, embodiments of the present disclosure will be described in detail to be easily carried out by those of ordinary skill in the art to which the disclosure pertains. The present disclosure may, however, be embodied in various forms and is not limited to the embodiments set forth herein.

In the drawings, the thickness of layers, films, panels, regions, or the like is exaggerated for clarity. Like reference numerals designate like elements throughout the specification. It will be understood that when an element such as a layer, film, region or substrate is referred to as being "on" another element, it may be "directly on" the other element or intervening elements may also be present. In contrast, when an element is referred to as being "directly on" another element, there are no intervening elements present.

The theoretical capacity of $LiCoO_2$ used as a cathode active material for a secondary battery is 272 mAh/g when internal lithium ions are extracted. However, when 50% of lithium ions are extracted from $LiCoO_2$, an irreversible structural change occurs. The irreversible structural change increases with repetitive charging/discharging, and is known to mainly occur during charging/discharging under high voltage conditions. The irreversible structural change is known to mainly occur under high voltage conditions and becomes a factor that deteriorates the characteristics of a battery during repetitive charging/discharging. Therefore, a reversible capacity that is capable of being actually used in $LiCoO_2$ is about 150 mAh/g, which is only half of the theoretical capacity.

Meanwhile, there have been attempts to use $LiFePO_4$ or $LiMnO_4$ as a cathode active material, which has capacity characteristics close to the theoretical capacity, but the theoretical capacity itself is about half that of $LiCoO_2$.

Therefore, for improving the energy density of the secondary battery, it is necessary to overcome the low reversible capacity or the low theoretical capacity of the existing cathode material.

Accordingly, inventors of the present disclosure have been striving to develop a cathode active material that is capable of simultaneously satisfying excellent theoretical capacity and reversible capacity, and when using a manganese-based metal oxide containing crystal water in the crystal structure as the cathode active material, it has been found that an electrochemical activation reaction of manganese and a binding reaction of manganese and oxygen in crystal water are mutually reversible.

In particular, the inventors of the present disclosure discovered a novel cathode active material capable of simultaneously satisfying excellent theoretical capacity, reversible capacity, and life characteristics by using the two reactions in a reversible relationship with each other and came to complete the present disclosure.

Hereinafter, two different crystal structures contained in a cathode active material according to an embodiment will be schematically described with reference to FIGS. 1 to 6.

FIG. 1 is a view illustrating two different crystal structures in a cathode active material according to an embodiment.

A cathode active material according to an embodiment may include crystal water and a manganese-based metal oxide. The manganese-based metal oxide may have a two-dimensional crystal structure (a dotted square in FIG. 1) in which a unit lattice structure in which manganese (Mn) and oxygen (O) are combined is two-dimensionally extended, as illustrated in FIG. 1, and may have a three-dimensional crystal structure (a dotted circle in FIG. 1) by combining manganese (Mn) of the manganese-based metal oxide with the oxygen of the crystal water.

Hereinafter, in an embodiment, for convenience, a phase having the two-dimensional crystal structure is referred to as a first crystal phase, and a phase having the three-dimensional crystal structure is referred to as a second crystal phase.

First, the first crystal phase has a two-dimensional crystal structure (layered crystal structure) made of manganese-based metal oxide. In an embodiment, in the unit lattice of the two-dimensional crystal structure, the manganese may fill an octahedral site of the unit lattice.

The two-dimensional crystal structure may include two or more unit layers made of manganese oxide and one or more metal element (Me) which is disposed between the unit layers and is selected from a group of metals other than manganese.

The metal element (Me) other than manganese may be repeatedly inserted into a space between the two or more unit layers during a charging/discharging process, or may be extracted from the space to repeatedly oxidize/reduce manganese (Mn). In detail, in the process of discharging the cathode active material according to an embodiment, the metal element (Me) other than manganese is inserted between the unit layers, and in the process of charging the cathode active material, the metal element (Me) other than manganese is extracted from the unit layers.

That is, the metal element (Me) other than manganese plays a role in inducing the electrochemical activity of manganese (Mn) by being inserted to and extracted from the interlayer of the two or more unit layers.

In an embodiment, examples of the metal element (Me) other than manganese may include an alkali metal element, an alkaline earth metal element, or a combination thereof. However, the metal elements (Me) other than manganese according to an embodiment are not necessarily limited thereto, and may include other typical elements or transition elements that are capable of contributing to the electrochemical activity of manganese (Mn) between the two or more unit layers.

In an embodiment, the crystal water may be further disposed between the two or more unit layers. That is, the crystal water may be disposed between the two or more unit layers together with the metal element (Me) excluding manganese.

Meanwhile, the crystal water may exist between the two or more unit layers. Unlike the metal element (Me) other than manganese, the crystal water may remain without being extracted from the interlayer of two or more unit layers. Accordingly, even when the metal element (Me) other than manganese is repeatedly inserted to or extracted from the interlayer of the two or more unit layers, an arrangement of the unit layers may be maintained without collapse.

In an embodiment, a gap may be provided between the two or more unit layers such that the metal element (Me) other than manganese is capable of being repeatedly inserted/extracted.

In an embodiment, the gap between the unit layers may vary depending on the content of crystal water in a unit layer and a type of metal element (Me) excluding manganese, but, may be for example, 3 Å or more, for example 4 Å or more, for example, 5 Å or more, for example, 6 Å or less, for example, 3 Å to 6 Å, for example 5 Å to 6 Å.

Meanwhile, the crystal water according to an embodiment may form a chemical bond with manganese (Mn) as described above. In an embodiment, the chemical bonding between the crystal water and manganese may be reversibly formed depending on charging/discharging. In detail, in the charging process of the cathode active material according to an embodiment, the bond between manganese (Mn) and oxygen constituting the unit layer is disassociated, and the metal element (Me) is extracted from the unit layer. In this case, the disassociated manganese (Mn) is combined with oxygen in the crystal water to form the three-dimensional crystal structure.

Meanwhile, during the discharging process of the cathode active material, the bond between oxygen in the crystal water and manganese (Mn) is disassociated, and the disassociated manganese (Mn) recombines with oxygen constituting the unit layer.

That is, in an embodiment, a reaction of forming a second crystal structure by the bonding of oxygen in the crystal water and manganese and a reaction of forming a first crystal structure by the bonding of oxygen constituting the unit layer and manganese (Mn) may be a mutually reversible relationship.

As described above, the phenomenon in which the reactions of forming the first and second crystal structures is mutually reversible is due to a difference in thermodynamic stability of the bond between oxygen in the crystal water and manganese (Mn) and the bond between oxygen constituting the unit layer and manganese (Mn).

In an embodiment, the first crystal phase formed through the bond between oxygen constituting the unit layer and manganese (Mn) is thermodynamically stable. However, the second crystal phase formed through the bond between oxygen in the crystal water and manganese (Mn) is thermodynamically metastable.

Accordingly, in the cathode active material according to an embodiment, during charging, the first crystal phase, which is the stable phase, may perform a phase transition to the second crystal phase, which is the metastable phase, by the external energy, and during discharging, the second crystal phase, which is the metastable phase, may perform a phase transition to the first crystal phase, which is the stable phase.

In an embodiment, the second crystal phase has the three-dimensional crystal structure as described above, and is the thermodynamically metastable phase.

According to an embodiment, in an initial state of the cathode active material that has not undergone charging or discharging, the second crystal phase may be contained in excess of 0, based on 100 parts by weight of the cathode active material, for example, 1 part by weight or more, for example 2 parts by weight, for example 3 parts by weight or more, for example, 4 parts by weight or more, for example, 5 parts by weight or more, and for example, 10 parts by weight or less, for example, more than 0 to less than 10 parts by weight, for example, 1 to 10 parts by weight.

When the second crystal phase is included in the above range in the initial state of the cathode active material according to an embodiment, although the charge/discharge cycle of the cathode active material increases, a reversible phase transition relationship between the first crystal phase and the second crystal phase may be maintained.

Meanwhile, in an embodiment, the crystal water may be contained 0.01 mol or more with respect to 1 mol of the manganese-based metal oxide, for example 0.02 mol or more, for example 0.03 mol or more, for example 0.05 mol or more, and for example, 0.5 mol or less, for example, 0.4 mol or less, for example, 0.3 mol or less, for example, 0.2 mol or less, and, for example, 0.01 mol to 0.5 mol, for example, 0.05 mol to 0.7 mol, for example 0.05 mol to 0.5 mol, for example 0.05 mol to 0.2 mol.

In an embodiment, when the crystal water may be contained 0.01 mol or less with respect to 1 mol of the manganese-based metal oxide, there is a concern that manganese (Mn) in the manganese-based metal oxide is combined with other oxygen in the manganese oxide layer, thereby forming a thermodynamically stable spinel phase as well as manganese (Mn) in the manganese-based metal oxide does not form the bond with oxygen in the crystal water. In this case, there is a concern that both the capacity characteristics and the life characteristics of the cathode active material according to the embodiment is capable of being greatly reduced as well as it is not possible to maintain the above-described reversible phase transition relationship due to the formation of the stable spinel phase.

Meanwhile, in an embodiment, even when the crystal water may be contained 0.5 mol or more with respect to 1 mol of the manganese-based metal oxide, there is a concern that the bond between oxygen in the crystal water and manganese (Mn) in the manganese-based metal oxide is not capable of being formed. In this case, even when charging/discharging is repeated, only the first crystal phase, which is the thermodynamically stable phase, exists, and thus there is a concern that the reversible phase transition relationship between the first crystal phase and the second crystal phase may not be displayed.

The second crystal phase according to an embodiment may have the three-dimensional crystal structure as described above. In the unit lattice of the three-dimensional crystal structure, manganese may fill octahedral sites and tetrahedral sites of the unit lattice. That is, manganese in the unit lattice of the two-dimensional crystal structure and manganese in the unit lattice of the three-dimensional crystal structure may have different numbers of bonds with oxygen.

In an embodiment, an arrangement relationship between manganese and oxygen in the unit lattice of the three-dimensional crystal structure illustrates a similar pattern to an arrangement relationship of a spinel crystal structure having manganese as a central element. However, unlike the general spinel crystal structure in which six parts of oxygen are bonded to one part of manganese (Mn), the three-dimensional crystal structure according to an embodiment may have four parts of oxygen bonded to one part of manganese (Mn) or six parts of oxygen bonded to one part of manganese (Mn) in the unit lattice.

The general spinel crystal structure is thermodynamically stable and exhibits irreversible properties. When the layered structure undergoes a phase transition to a thermodynamically stable spinel crystal structure during charging, the content of the spinel crystal structure gradually increases due to repeated charging/discharging. Since the spinel crystal structure has a lower theoretical capacity than that of the layered structure, the capacity and life of the cathode active material may be significantly reduced.

Therefore, when a general cathode active material for a secondary battery is used, it is necessary to control not to include a material having a spinel crystal structure, as well as to prevent a material having a spinel crystal structure from being generated in a repetitive charging/discharged state.

Because the general cathode active material for the secondary battery often forms the spinel crystal structure during charging to a high voltage, the charging/discharging is generally performed by lowering the voltage to prevent the formation of the spinel crystal structure. As the charging/discharging process is performed by lowering the voltage in this way, it has no choice but to exhibit a capacity lower than the theoretical capacity of the cathode active material.

However, in the cathode active material according to an embodiment, because the first crystal phase and the second crystal phase are in the reversible phase transition relationship, even when charging/discharging is repeated at a high voltage, excellent capacity characteristics close to the theoretical capacity and excellent life characteristics may be simultaneously exhibited through the reversible phase transition forming the thermodynamically metastable second phase in which manganese and oxygen in the crystal water are combined.

Meanwhile, in the cathode active material according to an embodiment, as illustrated in FIG. 1, the first crystal phase and the second crystal phase may be mixed therein. However, because the first crystal phase and the second crystal phase have different three-dimensional dimensions, even when the first crystal phase and the second crystal phase are mixed in the cathode active material, the overall microstructure thereof may appear differently depending on the content of the first crystal phase and the second crystal phase.

That is, when a certain region of the cathode active material is selected, the microstructure in the region indicates a microstructure corresponding structure having the crystal phase with a higher content of the first crystal phase and the second crystal phase.

Figure 2:
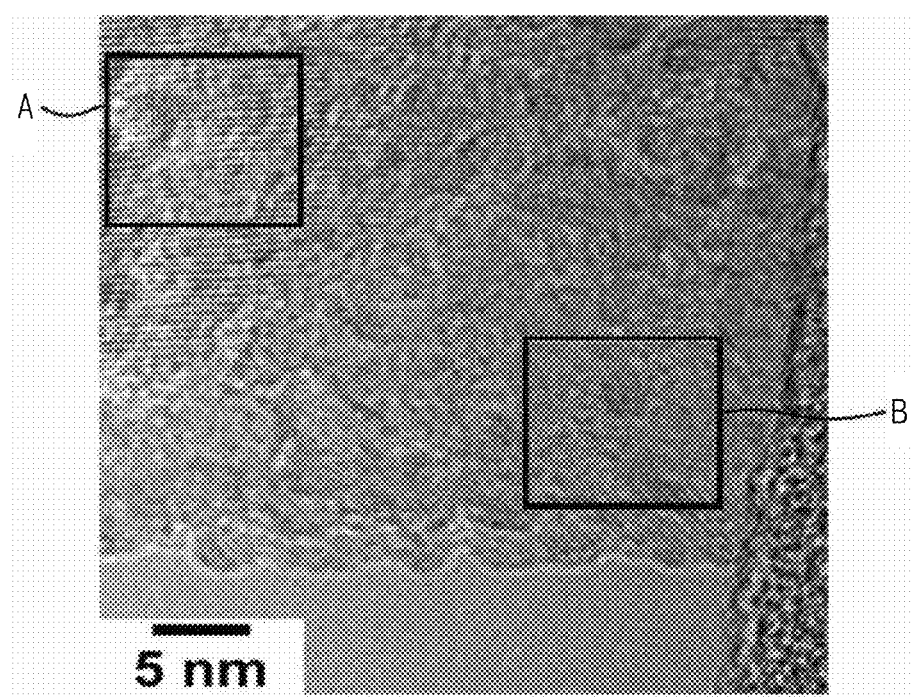
FIG. 2 is a TEM (Transmission Electron Microscopy) image illustrating a microstructure of a cathode active material according to an embodiment.

FIG. 2 is a TEM (Transmission Electron Microscopy) image illustrating a microstructure of a cathode active material according to an embodiment.

That is, as illustrated in FIG. 2, a cathode active material according to an embodiment may illustrate different microstructures depending on a content of a first crystal phase and a content of a second crystal phase in each of certain regions (region A and region B of FIG. 2). That is, the cathode active material may have microstructures that are distinguished from each other depending on the dominant crystal phase of each region.

Figure 3:
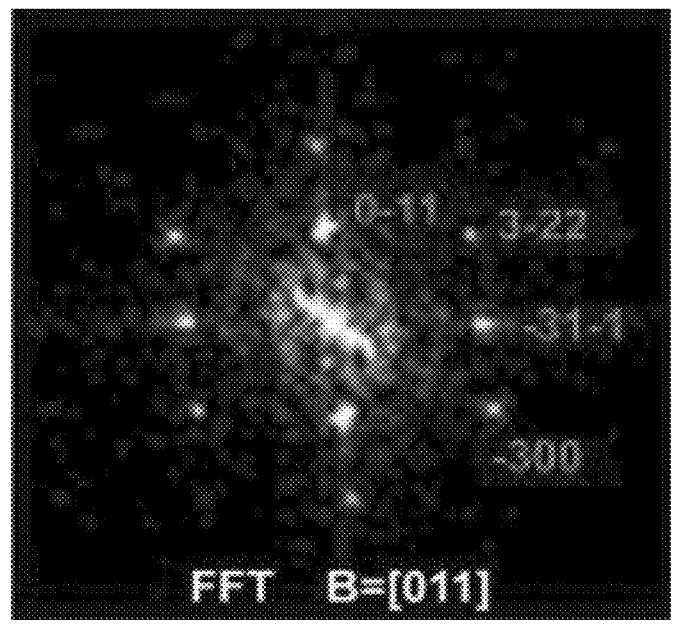
FIG. 3 is an image illustrating a result of a FFT (Fast Fourier Transform) analysis for region A of FIG. 2.
Figure 4:
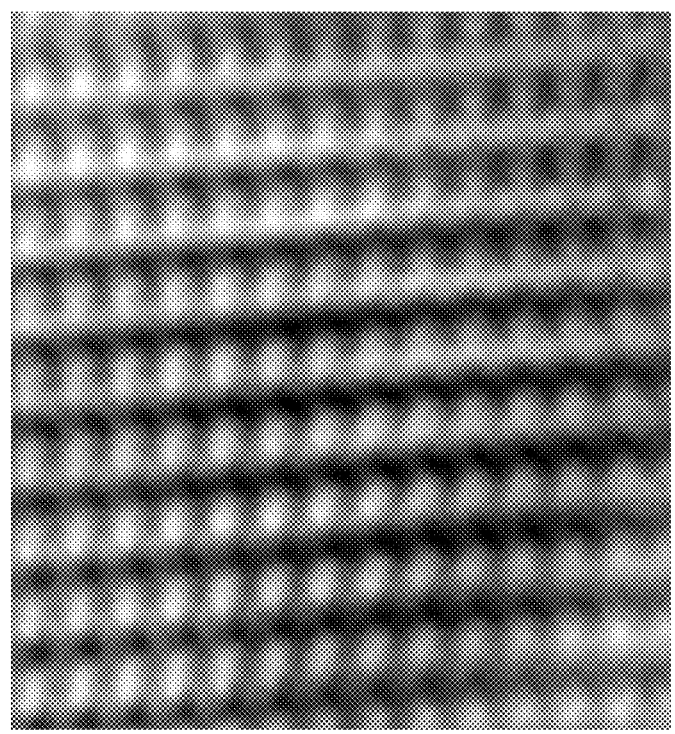
FIG. 4 is an inverse FFT image of the analysis result of FIG. 3.

FIG. 3 is an image illustrating a result of FFT (Fast Fourier Transform) analysis for region A of FIG. 2, and FIG. 4 is an inverse FFT image of the analysis result of FIG. 3.

For example, referring to FIGS. 3 and 4, it may be seen that the first crystal phase having a two-dimensional crystal structure is a dominant crystal phase in region A of the cathode active material according to an embodiment. Accordingly, in region A, a two-dimensional pattern, that is, a microstructure in which crystals extending along the horizontal direction of FIG. 3 are regularly arranged with respect to the vertical direction of FIG. 3 are mainly displayed.

Figure 5:
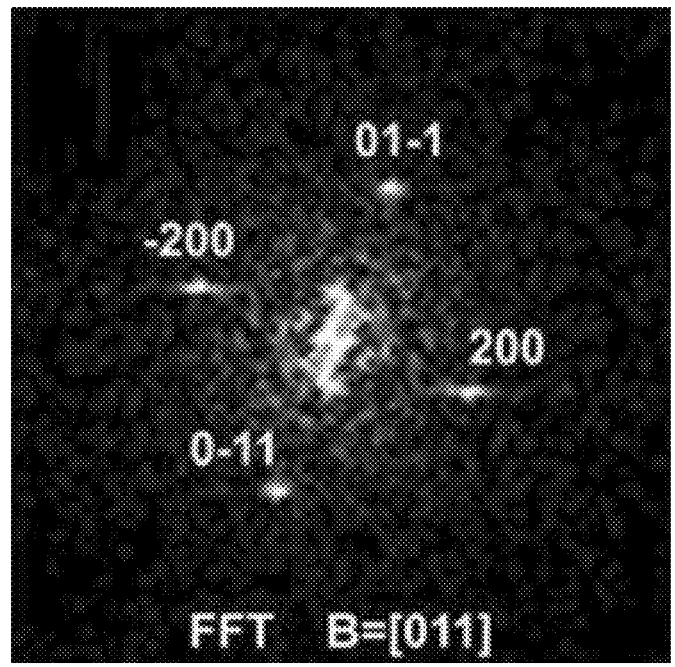
FIG. 5 is an image illustrating a result of a FFT (Fast Fourier Transform) analysis for region B of FIG. 2.
Figure 6:
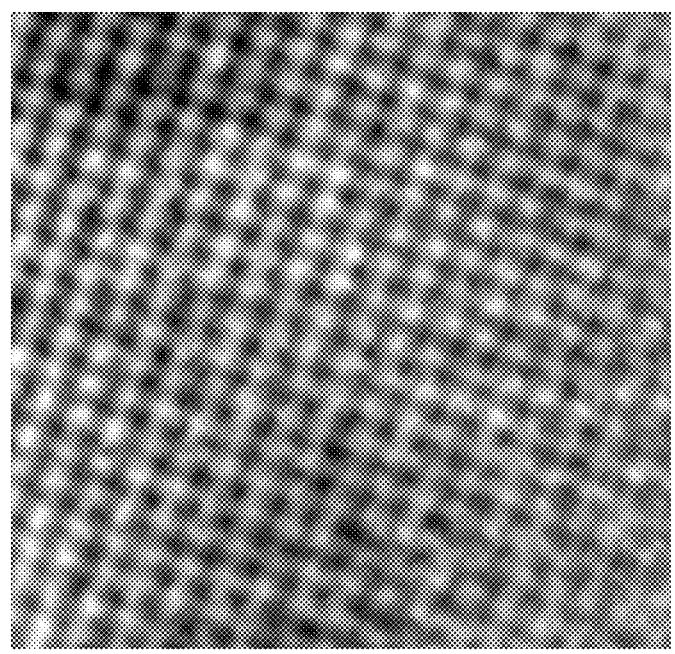
FIG. 6 is an inverse FFT image of the analysis result of FIG. 5, FIGS. 7 and 8 are views illustrating a change in a crystal structure during charging/discharging of a cathode active material according to an embodiment.

FIG. 5 is an image illustrating a fast Fourier transform (FFT) analysis result for region B of FIG. 2, and FIG. 6 is an inverse FFT image obtained by inversely transforming the analysis result of FIG. 5.

On the other hand, referring to FIGS. 5 and 6, it may be seen that a second crystal phase having a three-dimensional crystal structure is a dominant crystal phase in region B of the cathode active material according to an embodiment. Accordingly, in region B, a three-dimensional pattern, that is, a microstructure in which crystals extending in a direction intersecting each other in FIG. 5 form a repetitive pattern and are arranged, mainly appears.

As described above, the cathode active material according to an embodiment is a polycrystalline material having two distinct crystal phases, and the microstructure of the cathode active material may vary depending on which of the two crystal phases is the dominant crystal phase.

In an embodiment, the cathode active material may be represented by Formula 1 below.

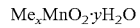    [Formula 1]

In Formula 1, Me is at least one metal element selected from the group consisting of an alkali metal element and an alkaline earth metal element, $0.23 \leq x \leq 1$, and $0.01 \leq y \leq 0.5$.

That is, the cathode active material according to an embodiment may be a metal-birnessite containing crystal water and exhibiting a two-dimensional layered crystal structure.

Meanwhile, in an embodiment, Me may be one or more elements selected from Li, Na, K, Mg, and Ca. That is, the cathode active material according to an embodiment may have a metal-birnessite structure belonging to the group of metals described above. For example, the cathode active material according to an embodiment may include one or more compounds selected from lithium-birnessite, sodium-birnessite, (lithium, sodium)-birnessite, potassium-birnessite, and the like.

Meanwhile, unlike the generally known metal-birnessite, in the cathode active material according to an embodiment, an electrochemical activity of manganese through repeated insertion/extraction of Me and a binding reaction of manganese and oxygen in the crystal water are mutually reversible. Accordingly, the cathode active material according to the embodiment may simultaneously exhibit excellent capacity characteristics close to theoretical capacity and excellent life characteristics although charging/discharging is repeated at a high voltage.

Hereinafter, reversible phase transition of the first and second crystal phases depending on charging/discharging of the cathode active material according to an embodiment will be described with reference to FIGS. 1 and 7 to 8 together.

Figure 7:
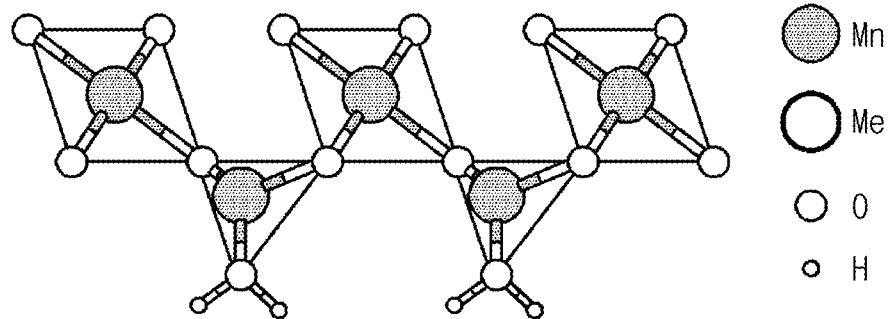
FIG. 7 is a charged state and FIG. 8 is a discharged state, respectively.
Figure 8:
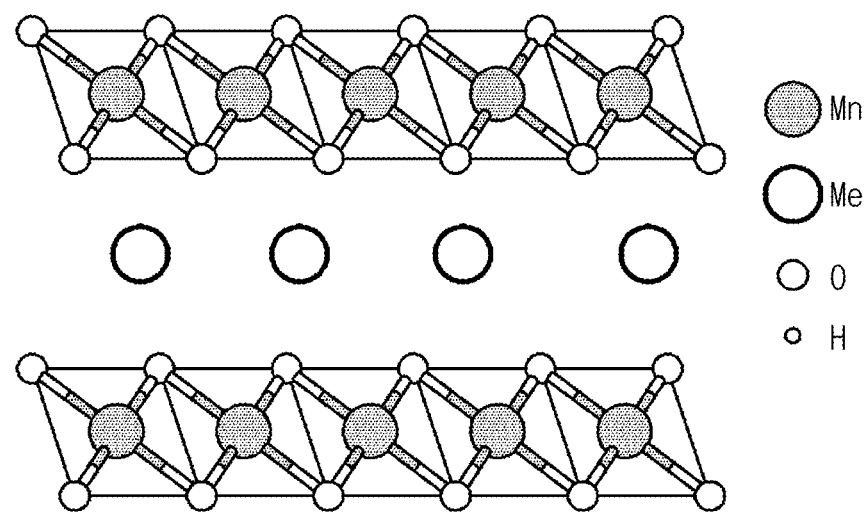

FIGS. 7 and 8 are views illustrating a change in a crystal structure during charging/discharging of a cathode active material according to an embodiment, and FIG. 7 is a charged state and FIG. 8 is a discharged state, respectively.

The cathode active material according to FIG. 1 described above is in an initial state that does not undergo charging/discharging, and as the cathode active material is charged and repeated once, internal crystal structures of the cathode active material according to an embodiment are sequentially changed in FIGS. 1, 7 and 8. In addition, when charging/discharging is repeated for the cathode active material for which the discharge is completed, the cathode active material repeats the internal crystal structure of FIGS. 7 and 8.

First, referring to FIG. 7, in the charged state of the cathode active material according to an embodiment, the first crystal phase is reduced and the second crystal phase is formed. In detail, in the charged state of the cathode active material, at least some of the manganese (Mn) in the manganese-based metal oxide migrates from the two-dimensional layered crystal structure, resulting in somewhat thermodynamically unstable compared to the two-dimensional layered crystal structure, and a reaction in which the migrated manganese (Mn) is combined with oxygen (O) in the crystal water proceeds predominantly. Therefore, as charging proceeds, the content of the second crystal phase in the cathode active material gradually increases.

On the other hand, referring to FIG. 8, in the discharged state of the cathode active material according to an embodiment, the second crystal phase is reduced and the first crystal phase is formed. In detail, in the discharged state of the cathode active material, the breaking of the bond between manganese (Mn) in the manganese-based metal oxide and oxygen (O) in the crystal water is dominant, and as migrated manganese (Mn) returns to a thermally stable direction, it is possible to form a two-dimensional layered crystal structure by bonding with oxygen constituting the unit layer. Therefore, as the discharging proceeds, the content of the first crystal phase in the cathode active material gradually increases.

As described above, the cathode active material according to an embodiment has a mutually reversible phase transition relationship between the thermodynamically stable first crystal phase and the thermodynamically metastable second crystal phase, and thus although charging/discharging is repeated, excellent capacity characteristics close to the theoretical capacity and excellent life characteristics may be implemented at the same time.

Hereinafter, a secondary battery including a cathode including a cathode active material according to an embodiment will be described with reference to FIG. 9.

Figure 9:
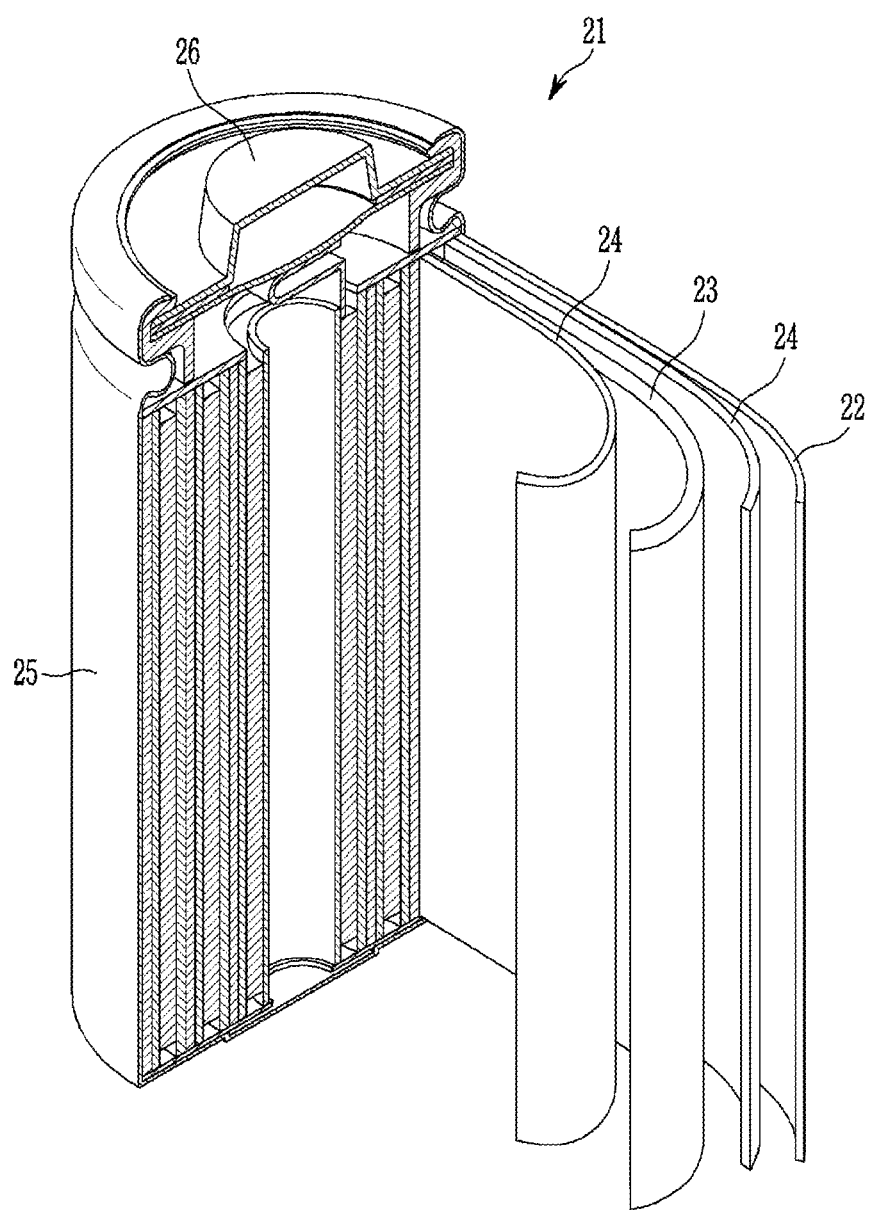
FIG. 9 is a view illustrating a secondary battery including a cathode active material according to an embodiment.

FIG. 9 is a view illustrating a secondary battery including a cathode active material according to an embodiment.

A secondary battery 21 according to FIG. 9 includes a cathode 23 containing a cathode active material according to an embodiment, an anode 22, and a separator 24 including electrolytes.

The cathode 23 and the anode 22 are prepared by coating and drying a composition for forming a cathode active material layer and a composition for forming an anode active material layer on a current collector, respectively.

The composition for forming the cathode active material is prepared by mixing the cathode active material, a conductive agent, a binder, and a solvent, and the cathode active material according to the above-described embodiment is used as the cathode active material.

The binder is a component that assists in bonding of the active material and the conductive agent and bonding to a current collector, and is added in an amount of 1 to 50 parts by weight based on 100 parts by weight of the total weight of the cathode active material. Non-limiting examples of the binder include polyvinylidene fluoride, polyvinyl alcohol, CMC (carboxymethylcellulose), starch, hydroxypropylcellulose, recycled cellulose, polyvinylpyrrolidone, tetrafluoroethylene, polyethylene, polypropylene, EPDM (ethylene-propylene-diene terpolymer), sulfonated EPDM, styrene butadiene rubber, fluorine rubber, and various copolymers. The content of the binder is 2 to 5 parts by weight based on 100 parts by weight of the total weight of the cathode active material. When the content of the binder is within the above range, the binding strength of the active material layer to the current collector is good.

The conductive agent is not particularly limited as long as it has conductivity without causing chemical changes in the battery, and for example, graphite such as natural graphite or artificial graphite; carbon-based materials such as carbon black, acetylene black, ketjen black, channel black, furnace black, lamp black, and thermal black; conductive fiber such as carbon fiber and metal fiber; carbon fluoride; metal powder such as aluminum and nickel powders; conductive whiskey such as zinc oxide and potassium titanate; conductive metal oxide such as titanium oxide; conductive material such as polyphenylene derivative may be used.

The content of the conductive agent is 1 to 10 parts by weight based on 100 parts by weight of the total weight of the cathode active material. When the content of the conductive agent is within the above range, the finally obtained electrode has excellent conductivity properties.

N-methylpyrrolidone and the like are used as a non-limiting example of the solvent.

The content of the solvent is 1 to 10 parts by weight based on 100 parts by weight of the cathode active material. When the content of the solvent is within the above range, an operation for forming the active material layer is easy.

A cathode current collector has a thickness of 3 μm to 500 μm, and is not particularly limited as long as it has high conductivity without causing a chemical change in the battery. For example, stainless steel, aluminum, nickel, titanium, heat-treated carbon, or aluminum or stainless steel with a surface treated by carbon, nickel, titanium, silver, or the like may be used. The current collector may form fine irregularities on its surface, and thus adhesion of the cathode active material may be increased and may be in various forms such as a film, a sheet, a foil, a net, a porous body, a foam, a nonwoven fabric, and the like.

Separately, an anode active material, a binder, a conductive agent, and a solvent are mixed to prepare the composition for forming the anode active material layer.

As the anode active material, for example, a carbon-based material such as graphite and carbon, lithium metal, an alloy thereof, and a silicon oxide-based material may be used.

The binder is added in an amount of 1 to 50 parts by weight based on 100 parts by weight of the total weight of the anode active material. As a non-limiting example of the binder, the same type as the cathode may be used.

The conductive agent is used in an amount of 1 to 5 parts by weight, based on 100 parts by weight of the anode active material. When the content of the conductive agent is within the above range, the finally obtained electrode has excellent conductivity properties.

The content of the solvent is 1 to 10 parts by weight based on 100 parts by weight of the total weight of the anode active material. When the content of the solvent is within the above range, an operation for forming the anode active material layer is easy.

The conductive agent and the solvent may be made of the same type of material as in manufacturing the cathode.

An anode current collector is generally made to have a thickness of 3 µm to 500 µm. The anode current collector is not particularly limited as long as it has conductivity without causing chemical changes to the battery, for example, copper, stainless steel, aluminum, nickel, titanium, heat-treated carbon, copper or stainless steel with a surface treated by carbon, nickel, titanium, silver, or the like, aluminum cadmium alloys, or the like may be used. In addition, like the cathode current collector, the anode current collector may form fine irregularities on its surface, and thus adhesion of the anode active material may be increased and may be in various forms such as a film, a sheet, a foil, a net, a porous body, a foam, a nonwoven fabric, and the like.

The separator is interposed between the anode and the cathode produced according to the above process.

The separator with a pore diameter of 0.01 µm to 10 µm and a thickness of 5 µm to 300 µm is used. As specific examples, olefin-based polymers such as polypropylene and polyethylene; or a sheet or nonwoven fabric made of glass fiber is used. When a solid electrolyte such as a polymer is used as the electrolyte, the solid electrolyte may also serve as a separator.

The electrolyte according to an embodiment may be a non-aqueous electrolyte. In an embodiment, the non-aqueous electrolyte may be a metal salt-containing non-aqueous electrolyte.

The metal salt-containing non-aqueous electrolyte is composed of a non-aqueous electrolyte solution and a metal salt. As the non-aqueous electrolyte, a non-aqueous electrolyte solution, an organic solid electrolyte, an inorganic solid electrolyte, or the like is used. As a metal constituting the metal salt, at least one selected from alkali metal and alkaline earth metal may be used. In an embodiment, the metal salt may be one selected from lithium salt, sodium salt, magnesium salt, potassium salt, and calcium salt. In an embodiment, the metal salt may be one selected from lithium salt and sodium salt.

An aprotic organic solvent such as propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, N,N-dimethylformamide, dioxolane, acetonitrile, nitromethane, methyl formate, methyl acetate, Phosphoric acid tryester, trimethoxy methane, dioxolane derivative, sulfolane, methyl sulfolane, 1,3-dimethyl-2-imidazolidinone, propylene carbonate derivative, tetrahydrofuran derivative, ether, methyl propionate, ethyl propionate, or the like may be used as non-limiting examples of the non-aqueous electrolyte.

Polyethylene derivatives, polyethylene oxide derivatives, polypropylene oxide derivatives, phosphate ester polymers, polyester sulfides, polyvinyl alcohol, polyvinylidene fluoride, or the like may be used as non-limiting examples of an organic solid electrolyte.

$Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like may be used as non-limiting examples of an inorganic solid electrolyte.

When a lithium salt is used as the metal salt, $LiCl$, $LiBr$, $LiI$, $LiCl$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, lithium tetraphenyl borate, imide, or the like may be used as non-limiting examples of a material that is easily soluble in the non-aqueous electrolyte.

As described above, the cathode 23, the anode 22, and the separator 24 are wound or folded to be accommodated in a battery case 25. Subsequently, an organic electrolyte is injected into the battery case 25 and sealed with a cap assembly 26, thereby completing the secondary battery 21 as illustrated in FIG. 9.

The battery case 25 may have a cylindrical shape, a square shape, or a thin film shape. For example, the secondary battery 21 may be a large thin film type battery. The secondary battery may be a lithium ion battery. The separator may be disposed between the cathode and the anode, and therefore a battery structure may be formed. The battery structure is impregnated with an organic electrolyte after being stacked in a bi-cell structure, and the resulting product is accommodated in a pouch and is sealed, thereby forming a lithium ion polymer battery. In addition, a plurality of the battery structures may be stacked to form a battery pack, and the battery pack may be used in all devices requiring high capacity and high output. For example, it may be used for laptop computers, smart phones, electric vehicles, and the like.

In the cathode of the secondary battery according to an embodiment, as described above, the reversible phase transition between the first crystal phase and the second crystal phase occurs depending on oxidation or reduction of manganese in the manganese-based metal oxide. That is, as described above, in the charged state of the secondary battery, at least part of the first crystal phase may be phase-transferred to the second crystal phase, and in the discharged state thereof, at least part of the second crystal phase may be phase-transferred to the first crystal phase.

That is, the secondary battery have the reversible phase transition relationship between the two-dimensional crystal structure and the three-dimensional crystal structure unlike the conventional metal-birnessite cathode active material, and as a result, may have excellent reversible capacity close to the theoretical capacity, and excellent life characteristics Accordingly, the secondary battery according to an embodiment may be used in an EV (electric vehicle). For example, it may be used in a hybrid vehicle such as a PHEV (plug-in hybrid electric vehicle).

The secondary battery according to an embodiment may exhibit excellent capacity characteristics and life characteristics because the above-described cathode active material for the secondary battery is used as a cathode active material.

Hereinafter, Examples of the present disclosure are presented. However, the Examples described below are only intended to specifically illustrate or explain the present disclosure, and the present disclosure is not limited thereto. In addition, information not described herein may be sufficiently technically inferred by those skilled in the art, and thus description thereof will be omitted.

EXAMPLE $NaMnO_4$ as a manganese precursor is mixed in a volume ratio of about 2% to 15%, for example, about 6% by volume with respect to 40 mL of distilled water, and then hydrothermal synthesis is performed at a temperature of 180° C. to 240° C., for example, 220° C. for 3 hours to 12 hours, for example, 6 hours, thereby obtaining a manganese-based oxide according to the embodiment.

After washing the obtained manganese-based oxide three times with distilled water, the manganese-based oxide is dried under vacuum for about 50 to 100° C., for example, about 60° C., for 6 to 48 hours, for example, about 24 hours, and thus residual moisture remaining on the surface of the manganese-based oxide is removed.

Thereafter, the dried manganese-based oxide is heat-treated under conditions of 150° C. to 300° C., and 3 hours to 12 hours. The heat treatment process is a process of controlling the content of the internal crystal water specifically. Only after the dried manganese-based oxide undergoes the heat treatment process, it is possible to achieve the reversible phase transition relationship between the first crystal phase and the second crystal phase described above.

In the heat treatment process, when the heat treatment temperature exceeds 300° C., there is a concern that the second crystal phase having the metastable phase is not capable of being formed, and when the heat treatment temperature is less than 150° C., the internal crystal water content becomes too large, and thus there is a concern that the electrochemical activity of the cathode active material is capable of being inhibited by a metal (Me) other than manganese, for example, sodium.

Meanwhile, when the heat treatment time exceeds 12 hours, there is a concern that particles is capable of being coarsened or the porous structure is capable of collapsing, and when the heat treatment time is less than 3 hours, the content of internal crystal water becomes too high, and thus there is a concern that the electrochemical activity of the cathode active material is capable of being inhibited by a metal (Me) other than manganese, for example, sodium.

In the case of Example, the cathode active material is manufactured by performing heat treatment by controlling the heat treatment temperature to 170° C. and the heat treatment time to 5 hours. The cathode active material of Example prepared through the heat treatment has a composition represented by $Na_{0.27}Mn_2.0.05H_2O$.

Comparative Example

After drying the manganese-based oxide, a cathode active material according to Comparative Example is manufactured through the same procedure as in the above-described Example, except that the heat treatment process is omitted.

The cathode active material according to Comparative Example has a composition represented by $Na_{0.27}Mn_2.0.54H_2O$.

Evaluation 1: Existence of Crystal Water in Cathode Active Material

Figure 10:
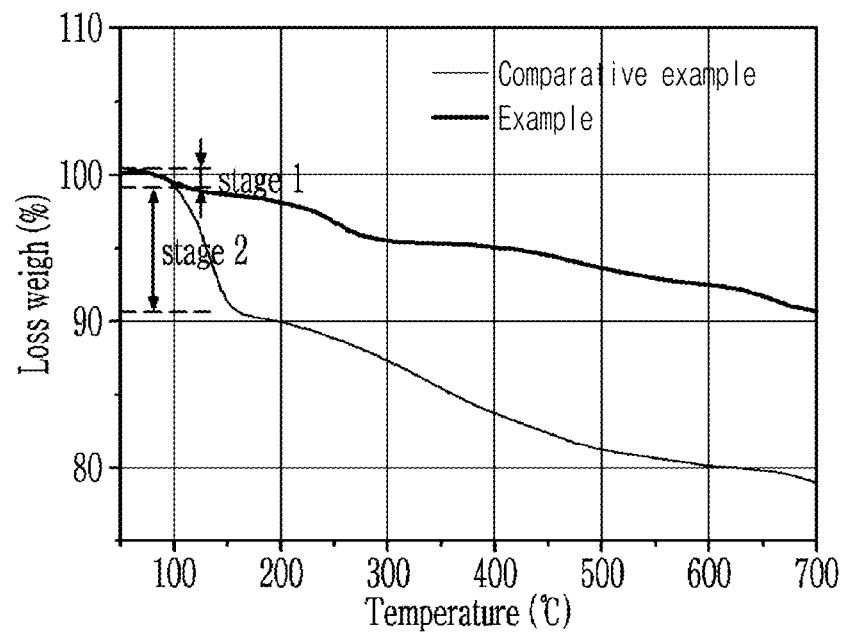
FIG. 10 is a graph illustrating results of the thermogravimetric analysis of cathode active materials according to Example and Comparative Example.

A change in weight of each cathode active material is measured using thermogravimetric analysis on cathode active materials according to Example and Comparative Example while raising the temperature from room temperature to 700° C., and is illustrated in FIG. 10.

FIG. 10 is a graph illustrating the results of the thermogravimetric analysis of cathode active materials according to Example and Comparative Example.

Referring to FIG. 10, it may be seen that the Example has only about 1.5% by weight of weight reduction from room temperature to 170° C., whereas the Comparative Example has about 9% by weight of weight reduction under the same conditions.

From the results of FIG. 10, it may be seen that the cathode active material according to Example has some crystal water remaining although the above-described heat treatment is further performed, compared to Comparative Example.

Evaluation 2: Formation of Second Crystal Phase in Cathode Active Material

Figure 11:
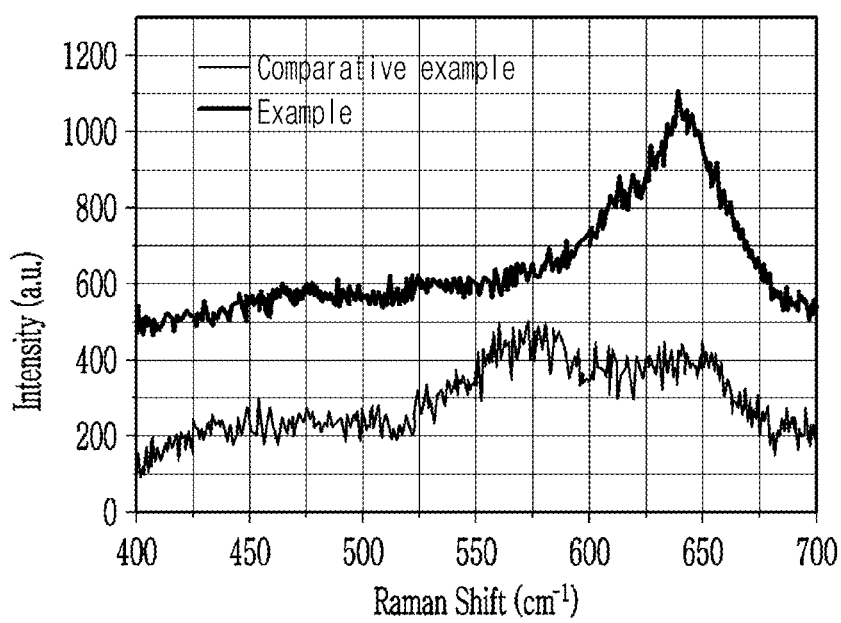
FIG. 11 is a graph illustrating Raman spectrums of cathode active materials according to Example and Comparative Example.

Raman spectrums of the cathode active materials according to the Example and Comparative Example using Raman spectroscopy are obtained and then are illustrated in FIG. 11.

FIG. 11 is a graph illustrating Raman spectrums of cathode active materials according to Example and Comparative Example.

Referring to FIG. 11, it may be seen that the cathode active material according to Comparative Example has a broad peak at about 575 $cm^{-1}$. The peak in this band is generally identified as a peak appearing in a layered crystal structure.

Meanwhile, it may be seen that the cathode active material according to Example has a prominent peak at about 650 $cm^{-1}$. The peak in this band is identified as a peak appearing in a spinel crystal structure.

Considering that the Raman spectrum result reflects the characteristics of a surface of a subject to be measured, a fact that the cathode active material according to Example has the prominent peak at about 650 $cm^{-1}$ means that the surface, which had the layered crystal structure before heat treatment, has a crystal structure similar to the spinel through the heat treatment, and thus the surface is changed to be mixed with the layered crystal structure and the spinel-like crystal structure.

Accordingly, from the results of FIG. 11, it may be seen that, in the cathode active material according to the embodiment, the second crystal phase having at least the crystal structure similar to that of spinel is well-formed. Further, in view of the principle of the Raman spectrum, it may be interpreted that the second crystal phase is mixed with the first crystal phase having the layered crystal structure.

Evaluation 3: Crystal Structure of Cathode Active Material

Figure 12:
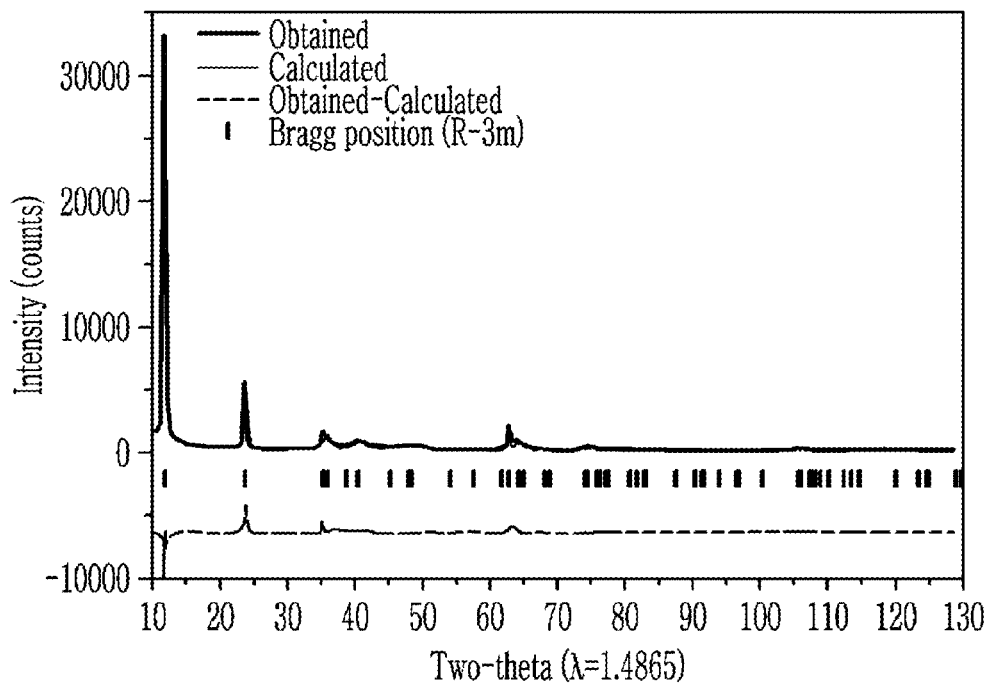
FIG. 12 is a graph illustrating an X-ray diffraction pattern of a cathode active material according to Example.
Figure 13:
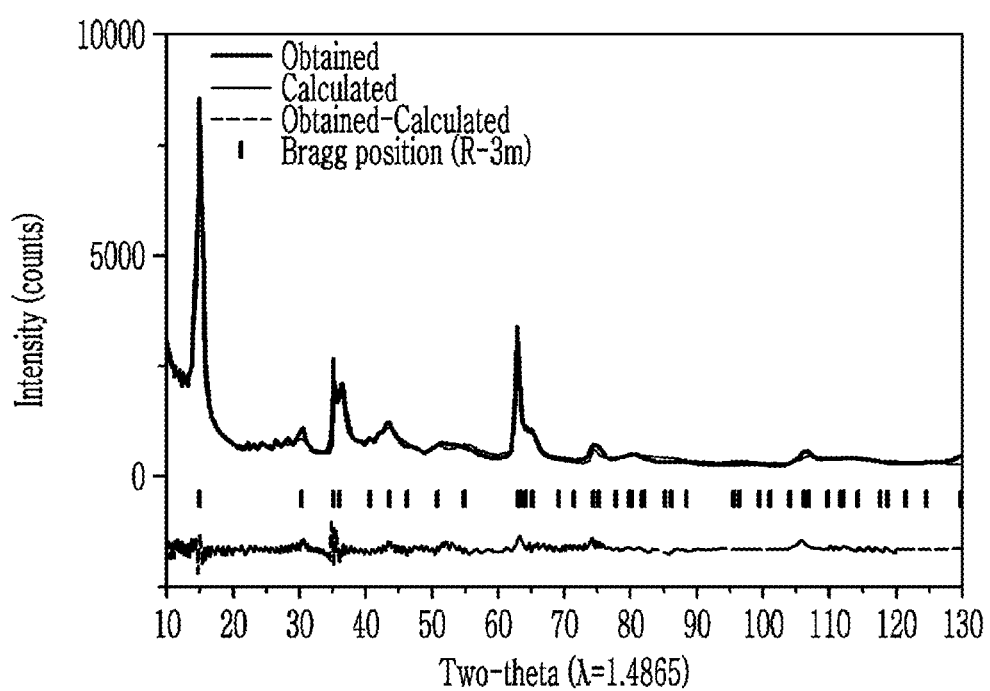
FIG. 13 is a graph illustrating an X-ray diffraction pattern of a cathode active material according to Comparative Example.

X-ray diffraction graphs for the cathode active materials according to Example and Comparative Example are derived using X-ray Diffraction Analysis, and then are illustrated in FIGS. 12 and 13, respectively.

FIG. 12 is a graph illustrating an X-ray diffraction spectrum of a cathode active material according to Example, and FIG. 13 is a graph illustrating an X-ray diffraction spectrum of a cathode active material according to Comparative Example.

Referring to FIGS. 12 and 13, first, it may be seen that distances between the two manganese oxide unit layers in the cathode active materials according to the Example and the Comparative Example, that is, distances between the unit layers based on the (001) direction are 5.55 Å and 7.27 Å, respectively. Accordingly, it may be seen that, in the cathode active material according to Example, the gap between the unit layers is reduced, compared to Comparative Example, by removing the crystal water through the heat treatment process, and the crystal structure also changes.

In addition, when analyzing FIGS. 12 and 13 using Rietveld structure refinement, the crystal structure illustrated in Table 1 below may be obtained.

TABLE 1

| Comparative Example (Rwp = 11.6%, Rp = 16.5, Rex = 4.88, S (=Rwp/Rex) = 3.38) Space group: R-3ma = b = 2.8510(7) Å, c = 21.739(6) Å, Vol = 153.03(7) Å$^3$, α = β = 90°, γ = 120° | | | | | | |
|---|---|---|---|---|---|---|
| Atom | Site | x | Y | z | B iso/Å$^2$ | occ |
| Na | 3b | 0.0 | 0.0 | 0.5 | 0.7(2) | 0.135 |
| (Mn) | 3a | 0.0 | 0.0 | 0.0 | 0.7(2) | 0.5 |
| O | 6c | 0.0 | 0.0 | 0.374(2) | 0.7(2) | 1 |
| Example (Rwp = 10.0%, Rp = 6.77, Rex = 3.98, S (=Rwp/Rex) = 2.51) Space group: R-3ma = b = 2.8408(6) Å, c = 16.95(1) Å, Vol = 118.5(1) Å$^3$, α = β = 90°, γ = 120° | | | | | | |
| Atom | site | x | Y | z | B iso/Å$^2$ | occ |
| Na | 3b | 0.0 | 0.0 | 0.5 | 2.0(3) | 0.135 |
| Mn1 | 3a | 0.0 | 0.0 | 0.0 | 2.0(3) | 0.35(1) |
| Mn2 | 6c | 0.0 | 0.0 | 0.112(3) | 2.0(3) | 0.14(1) |
| O | 6c | 0.0 | 0.0 | 0.394(2) | 2.0(3) | 1 |

Referring to Table 1, it is analyzed that (Mn) is present in a 3a site (octahedral site) in the cathode active material according to Comparative Example. That is, in the cathode active material according to the comparative example, (Mn) forms a coordination bond with 6 oxygen atoms, and as a result, it may be seen that only the first crystal phase corresponding to the layered crystal structure exists. On the other hand, it may be seen that, in the cathode active material according to the embodiment, not only (Mn) at the 3a site but also (Mn) at the 6c site (tetrahedral site) coexist. That is, in the cathode active material according to the embodiment, it is analyzed that manganese is also present in the tetrahedral site forming a coordination bond with four oxygen atoms, and thus, it may be seen that the cathode active material according to the embodiment has both the first crystal phase corresponding to the layered crystal structure and the second crystal phase corresponding to the three-dimensional crystal structure (crystal structure similar to spinel).

Evaluation 4: Change in Crystal Structure Depending on Charging/Discharging of Cathode Active Material A half-cell is manufactured using the cathode active material according to Example. The half-cell is made of sodium as a counter electrode and a reference electrode.

Figure 14:
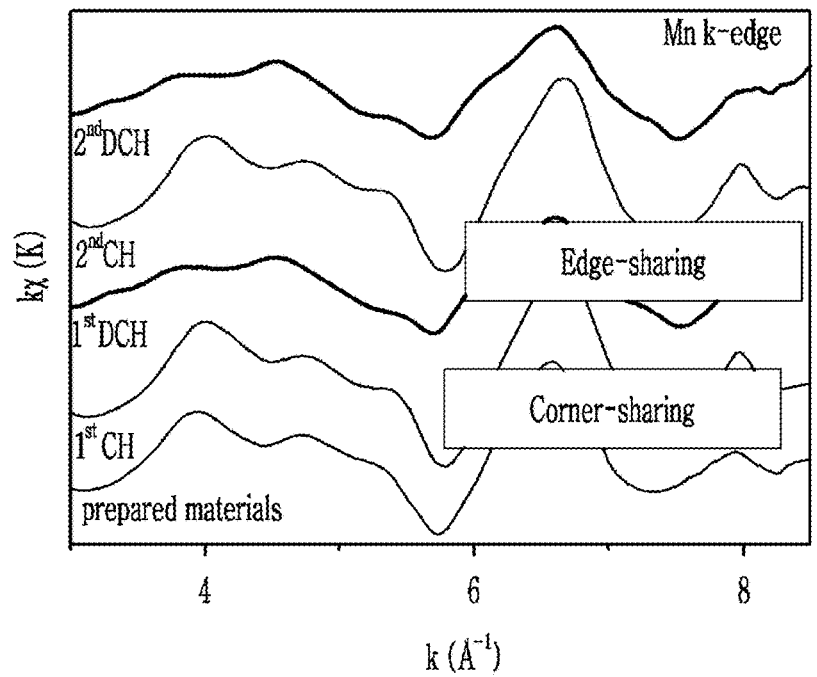
FIG. 14 is a result of an EXAFS (extended X-ray absorption fine structure) analysis of manganese (Mn) according to charging/discharging of a cathode active material according to Example.
Figure 15:
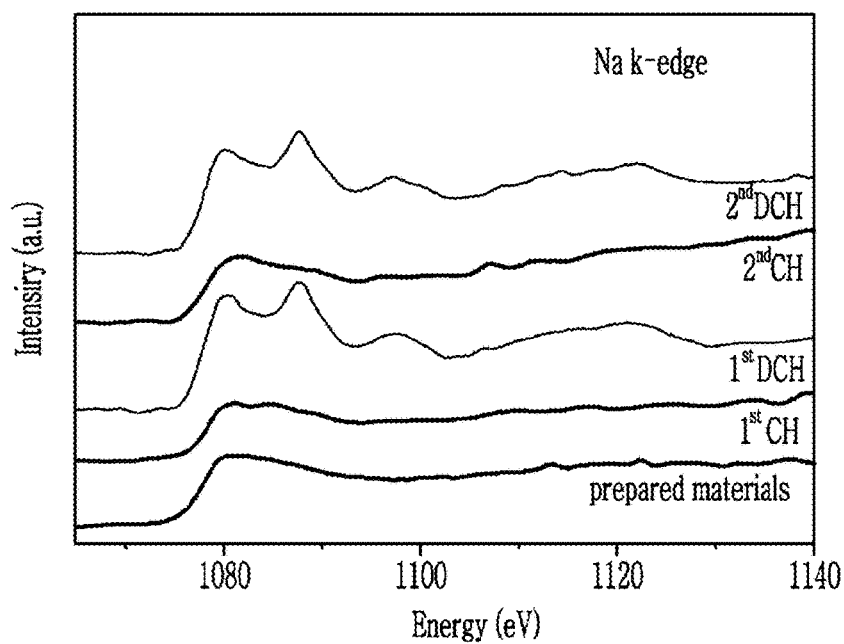
FIG. 15 is a result of an XANES (X-ray absorption near-edge structure) analysis of sodium (Na) according to charging/discharging of a cathode active material according to Example.

Thereafter, while the manufactured half-cell is charged/discharged twice at a current density of 0.1 C in a voltage range of 1.5 V to 4.3 V, an EXAFS (extended X-ray absorption fine structure) analysis for manganese (Mn) and an XANES (X-ray absorption near-edge structure) analysis for sodium (Na) are performed, and the results are illustrated in FIGS. 14 and 15, respectively.

FIG. 14 is a result of an EXAFS (extended X-ray absorption fine structure) analysis of manganese (Mn) according to charging/discharging of a cathode active material according to Example, and FIG. 15 is a result of an XANES (X-ray absorption near edge structure) analysis of sodium (Na) according to charging/discharging of a cathode active material according to Example.

First, referring to FIG. 14, it may be seen that even when repetitive charging/discharging is performed, the oxidation number of manganese (Mn) has a consistent outline for every charging step and every discharging step. In addition, because the oxidation number of manganese (Mn) is effectively changed through charging/discharging, it may be confirmed that the oxidation/reduction reaction of manganese is stably performed during charging/discharging.

Meanwhile, it may be seen that manganese has complex characteristics of tetrahedral and octahedral due to corner-sharing in prepared material and charged state of manganese (Mn), and thus the three-dimensional crystal structure (spinel-like structure) dominates in the prepared material and charged state.

On the other hand, it may be seen that manganese has octahedral characteristics due to edge-sharing in the discharged state of manganese (Mn), and thus the two-dimensional layered crystal structure dominates in the discharged state.

Meanwhile, referring to FIG. 15, it may be seen that the outline of the graph showing the state of discharge of sodium (Na) represents a typical outline of a graph having a general layered crystal structure.

Figure 16:
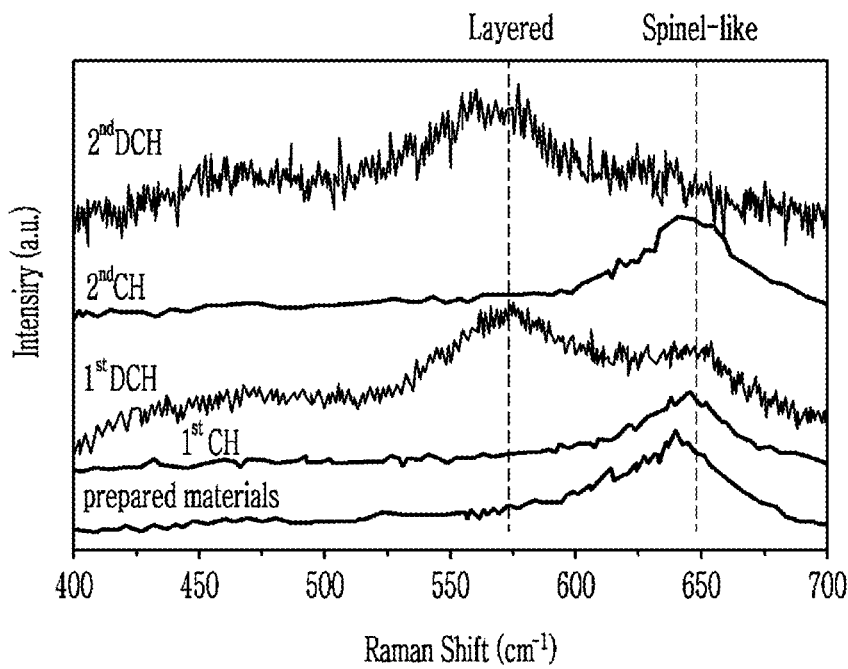
FIG. 16 is a graph illustrating a Raman spectrum according to charging/discharging of a cathode active material according to Example.

Meanwhile, a Raman spectrum is obtained using Raman spectroscopy while charging/discharging under the same conditions for the prepared half-cell, and is illustrated in FIG. 16.

FIG. 16 is a graph illustrating a Raman spectrum according to charging/discharging of a cathode active material according to Example.

Referring to FIG. 16, it may be seen that the cathode active material according to the embodiment exhibits a crystal structure similar to that of spinel in a charged state, and exhibits a crystal structure corresponding to a layered crystal structure in a discharged state.

Accordingly, from the results of FIGS. 14 to 16, it may be confirmed that the first crystal phase and the second crystal phase are reversibly phase-transitioned to each other depending on charging/discharging in the cathode active material according to Example.

Evaluation 5: Capacity Characteristics of Cathode Active Material

With respect to the cathode active material according to Example, a half-cell is manufactured in the same manner as in Evaluation 4 described above.

Figure 17:
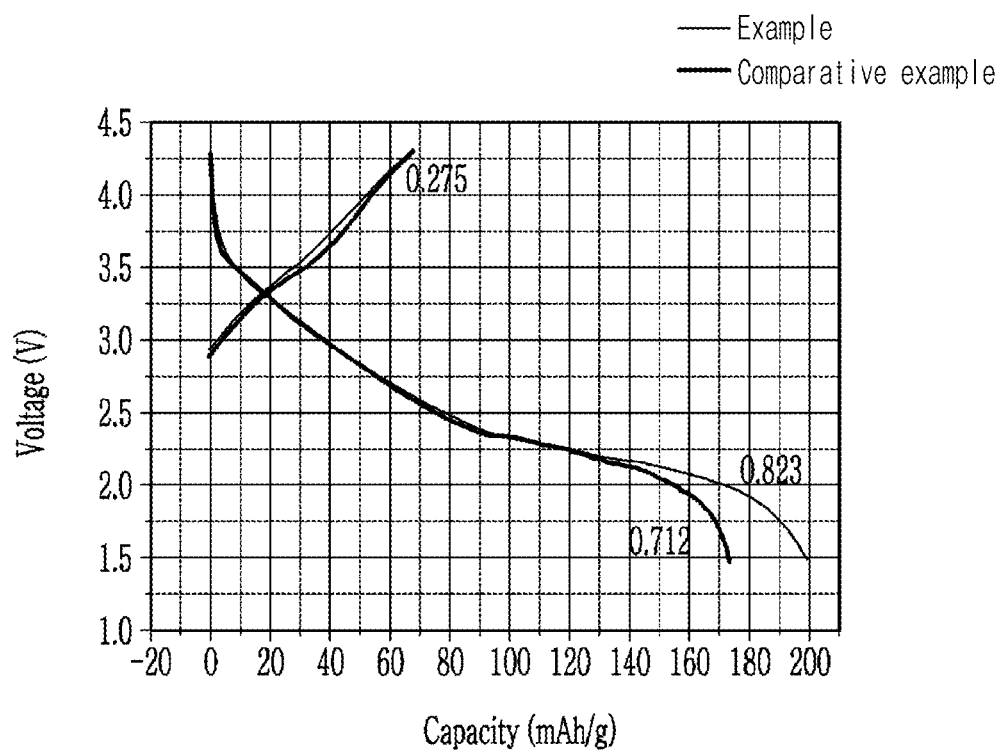
FIG. 17 is a graph illustrating initial charge/discharge characteristics of secondary batteries including cathode active materials according to Example and Comparative Example.

Thereafter, charging/discharging is performed once at a current density of 0.1 C in a voltage range of 1.5 V to 4.3 V for the manufactured half-cell, and the result is illustrated in FIG. 17.

FIG. 17 is a graph illustrating initial charge/discharge characteristics of secondary batteries including cathode active materials according to Example and Comparative Example.

Referring to FIG. 17, both of the cathode active materials according to the Example and the Comparative Example exhibited a capacity of about 70 mAh/g upon first charging, which corresponds to about 0.275 mol sodium ions. From this, it may be seen that the heat treatment process for removing the crystal water does not affect the amount of sodium ions.

Meanwhile, when performing the first discharge, it may be seen that the cathode active material according to Example exhibits a capacity of about 200 mAh/g, and the cathode active material according to Comparative Example exhibits a capacity of about 170 mAh/g.

That is, from the results of FIG. 17, it may be seen that the cathode active material according to Example exhibits superior capacity characteristics compared to Comparative Example.

Evaluation 6: Life and Rate Performance Characteristics of Cathode Active Material With respect to the cathode active material according to Example, a half-cell is manufactured in the same manner as in Evaluation 4 described above.

Figure 18:
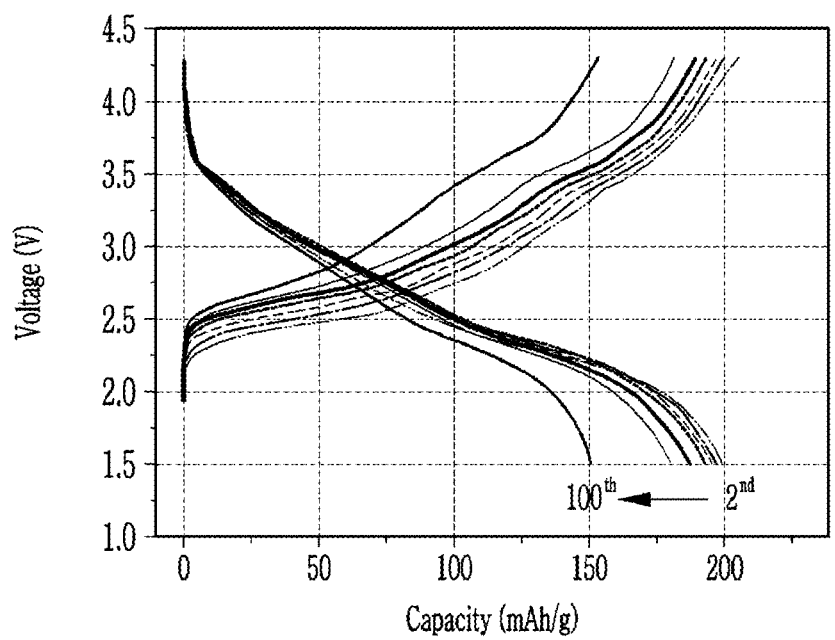
FIG. 18 is a graph illustrating charge/discharge cycle characteristics of a secondary battery including a cathode active material according to Example.
Figure 19:
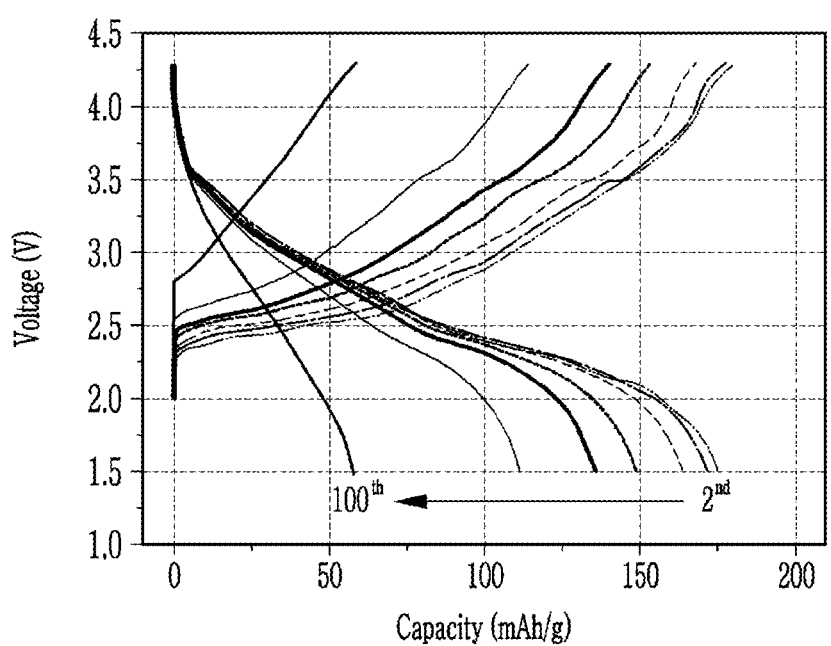
FIG. 19 is a graph illustrating charge/discharge cycle characteristics of a secondary battery including a cathode active material according to Comparative Example.
Figure 20:
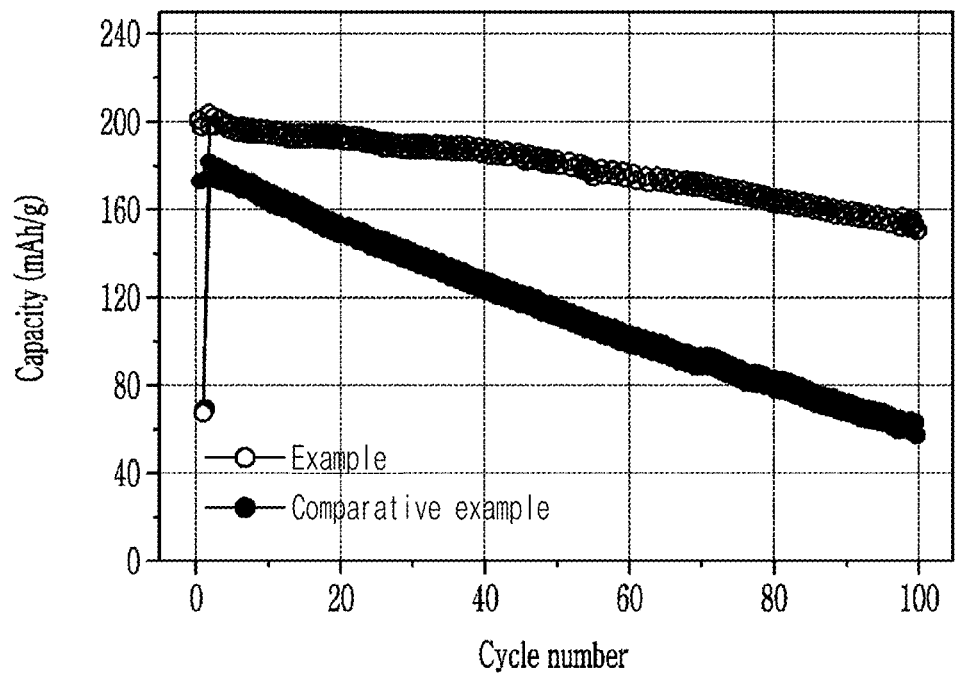
FIG. 20 is a graph illustrating cycle capacity characteristics for secondary batteries including cathode active materials according to Example and Comparative Example, respectively.

Thereafter, charging/discharging at a current density of 0.1 C in a voltage range of 1.5 V to 4.3 V with respect to the manufactured half-cell is performed at 100 cycles, and the results are illustrated in FIGS. 18 to 20, respectively.

FIG. 18 is a graph illustrating cycle charge/discharge characteristics of a secondary battery including a cathode active material according to Example, FIG. 19 is a graph illustrating cycle charge/discharge characteristics of a secondary battery including a cathode active material according to Comparative Example, and FIG. 20 is a graph illustrating cycle capacity characteristics for secondary batteries including cathode active materials according to Example and Comparative Example, respectively.

Referring to FIGS. 18 and 20, it may be seen that even when charging and discharging are performed over 100 cycles, the capacity reduction of the cathode active material according to Example is significantly less than that of the cathode active material according to Comparative Example.

Figure 21:
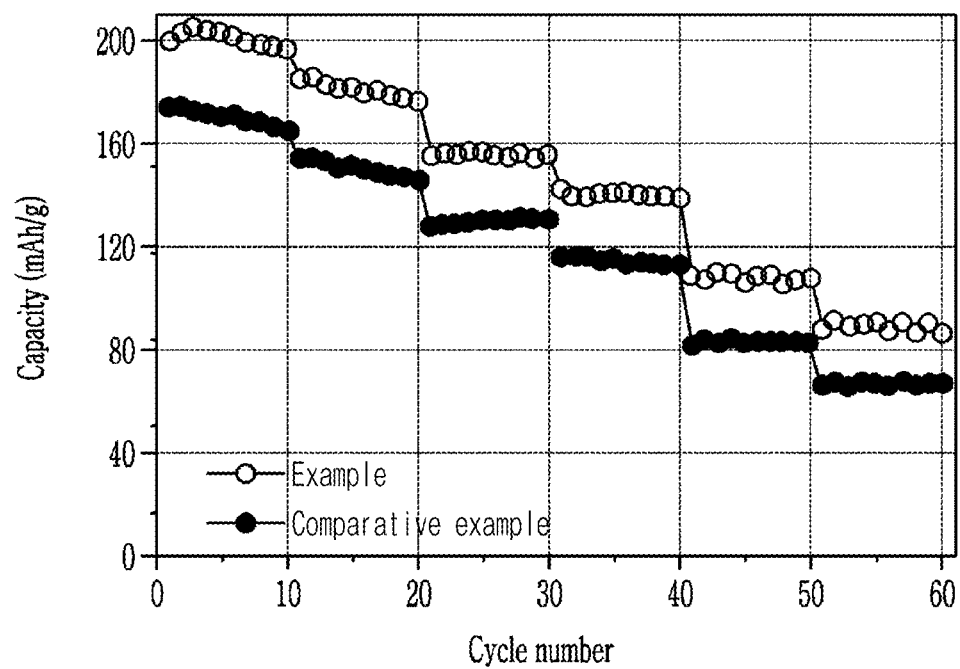
FIG. 21 is a graph illustrating rate performance characteristics for secondary batteries including cathode active materials according to Example and Comparative Example, respectively.

Meanwhile, with respect to the manufactured half-cell, the current density is increased from 0.1 C to 0.2 C, 0.5 C, 1 C, 3 C, and 5 C every 10 cycles of charging/discharging, and the rate-performance characteristics for a total of 60 cycles are measured, and the results are illustrated in FIG. 21.

FIG. 21 is a graph illustrating rate performance characteristics for secondary batteries including cathode active materials according to Example and Comparative Example, respectively.

Referring to FIG. 21, even when the charge/discharge rate is gradually increased, it may be seen that the cathode active material according to Example exhibits superior capacity in all cycles compared to the cathode active material according to Comparative Example.

That is, from the results of FIGS. 18 to 21, it may be seen that the cathode active material according to Example exhibits excellent life and rate performance characteristics compared to Comparative Example.

Although the preferred embodiments of the present disclosure have been described in detail above, the scope of the present disclosure is not limited thereto, and various modifications and improved forms by those skilled in the art using the basic concept of the present disclosure defined in the following claims also belong to the scope of the present disclosure.

The invention claimed is:

1. A cathode active material comprising:
crystal water; and
a manganese-based metal oxide,
wherein the cathode active material includes a first crystal phase having a two-dimensional crystal structure and a second crystal phase having a three-dimensional crystal structure, and
wherein the three-dimensional crystal structure is formed by a combination of manganese in the manganese-based metal oxide and oxygen in the crystal water.

2. The cathode active material of claim 1, wherein, in a unit lattice of the three-dimensional crystal structure, the manganese fills an octahedral site and a tetrahedral site of the unit lattice.

3. The cathode active material of claim 1, wherein in a unit lattice of the two-dimensional crystal structure, the manganese fills an octahedral site of the unit lattice.

4. The cathode active material of claim 1, wherein the second crystal phase has manganese, from which more than 0 and ¼ of manganese filling an octahedral site in the first crystal phase is extracted, filling a tetrahedral site to form a coordination bond with four oxygen atoms.

5. The cathode active material of claim 1, wherein the crystal water is contained 0.01 mol to 0.5 mol with respect to 1 mol of the manganese-based metal oxide.

6. The cathode active material of claim 1, wherein the two-dimensional crystal structure includes two or more unit layers including manganese oxide, and at least one metal element which is disposed between two or more unit layers and is selected from the group of metals other than the manganese.

7. The cathode active material of claim 6, wherein a gap between the unit layers is 3 Å to 6 Å.

8. The cathode active material of claim 6, wherein at least some of the crystal water is disposed between the two or more unit layers.

9. The cathode active material of claim 1, wherein the first crystal phase is a stable phase, the second crystal phase is metastable, and the first crystal phase and the second crystal phase have a reversible phase transition relationship.

10. The cathode active material of claim 1, wherein the cathode active material is represented by Formula 1 below,

$$Me_xMnO_2 \cdot yH_2O \qquad \text{[Formula 1]}$$

where Me is at least one metal element selected from the group consisting of an alkali metal element and an alkaline earth metal element, $0.23 \leq x \leq 1$, and $0.01 \leq y \leq 0.5$.

11. The cathode active material of claim 10, wherein the Me is at least one element selected from Li, Na, K, Ca, and Mg.

12. A cathode comprising the cathode active material of claim 1.

13. A secondary battery comprising a cathode of claim 12; an anode; and an electrolyte interposed between the cathode and the anode.

14. The secondary battery of claim 13, wherein the electrolyte is a non-aqueous electrolyte.

15. The secondary battery of claim 13, wherein, in the anode, a reversible phase transition between the first crystal phase and the second crystal phase occurs depending on oxidation or reduction of manganese in the manganese-based metal oxide.

16. The secondary battery of claim 13, wherein, in a charged state of the secondary battery, at least a part of the first crystal phase is phase-transferred to the second crystal phase.

17. The secondary battery of claim 13, wherein in a discharged state of the secondary battery, at least a part of the second crystal phase is phase-transferred to the first crystal phase.

* * * * *